(12) United States Patent
Tucholski

(10) Patent No.: US 6,224,640 B1
(45) Date of Patent: May 1, 2001

(54) V-SHAPED GASKET FOR GALVANIC CELLS

(75) Inventor: Gary R. Tucholski, Parma Heights, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/320,079

(22) Filed: May 26, 1999

Related U.S. Application Data

(62) Division of application No. 08/882,572, filed on Jun. 25, 1997, now Pat. No. 5,925,478.

(51) Int. Cl.⁷ .............................. H01M 2/08; H01M 2/12
(52) U.S. Cl. ........................ 29/623.2; 429/56; 429/172; 429/174; 429/185
(58) Field of Search .............................. 429/56, 171, 172, 429/174, 175, 185; 29/623.2

(56) References Cited

U.S. PATENT DOCUMENTS

| 5,080,985 | * | 1/1992 | Wiacek et al. | 429/172 |
| 5,227,261 | * | 7/1993 | Georgopoulos | 429/56 |
| 5,422,201 | * | 6/1995 | Georgopoulos | 426/170 |
| 5,478,669 | * | 12/1995 | Flack | 429/174 |
| 5,589,293 | * | 12/1996 | Pope et al. | 429/172 |
| 5,750,283 | * | 5/1998 | De Palma et al. | 429/172 X |

* cited by examiner

Primary Examiner—Stephen Kalafut
(74) Attorney, Agent, or Firm—Stewart A. Fraser

(57) ABSTRACT

An electrochemical cell containing a V-shaped gasket for sealing the cell and preferably the gasket has a compressive preloading on a selected area of the gasket to prevent premature venting of the cell.

9 Claims, 2 Drawing Sheets

V-SHAPED GASKET FOR GALVANIC CELLS

CROSS REFERENCE TO RELATED APPLICATION

The present application is a division of commonly owned U.S. patent application Ser. No. 08/882,572 filed on Jun. 25, 1997, entitled "A V-SHAPED GASKET FOR GALVANIC CELLS", now U.S. Pat. No. 5,925,478.

FIELD OF THE INVENTION

The invention relates to a V-shaped gasket seal for galvanic cells and more particularly to a compressive preloaded gasket seal means for preventing premature release of gas pressure from inside the cells.

BACKGROUND OF THE INVENTION

Galvanic cells may generate large quantities of gas under certain conditions during use. Since these cells are required to be tightly sealed at all times in order to prevent loss of electrolyte by leakage, high internal gas pressures may develop. Such pressures may cause leakage, bulging or possible explosion of the cell if not properly vented. If a vent valve is employed, it may be resealable in order to avoid drying out of the electrolyte over the life of the cell and to prevent ingress of oxygen from the atmosphere which can cause wasteful corrosion of the anode.

In the past several different types of resealable pressure relief vent valves have been used for releasing high internal gas pressures from inside a sealed galvanic cell. One type of valve that has been commonly used consists basically of a valve member, such as a flat rubber gasket, which is biased into a sealing position over a vent orifice by means of a resilient member, such as a helical spring. The resilient member or spring is designed to yield at a certain predetermined internal gas pressure so as to momentarily relieve the seal and allow the gas to escape through the vent orifice.

Another type of resealable vent is disclosed in U.S. Pat. No. 3,451,690 to Richman issued on Dec. 10, 1968. In this vent, a flat elastomeric seal gasket overlies the vent opening and is retained in place by a resilient terminal cap on the top of the cell. This vent operates in basically the same manner as the vents previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of a predetermined high internal gas pressure inside the container so as to momentarily break the seal and allow gas to escape through the vent orifice.

Alternates to high pressure resealable vent means are fail safe venting systems as illustrated in U.S. Pat. Nos. 3,218, 197 and 3,314,824. Specifically in the '197 patent a venting means is disclosed in which the seal gasket has a thin section that will rupture or "blow-out" at a predetermined high pressure buildup within the cell. The difficulty with this type of venting means is that for small diameter cells it is difficult to obtain consistency in the thickness of the "blow-out" section of the gasket using conventional manufacturing techniques. In the '824 patent a puncture-type safety seal is disclosed which comprises a spring washer positioned within the cell's seal assembly and a radially acting toothed puncture washer. The teeth of the washer slide relative to the spring washer when the spring washer is subjected to internal pressure so that at a predetermined gas pressure buildup, the teeth of the washer will puncture the seal's gasket thereby providing a vent passage. This type of venting means requires several component parts, is rather expensive to make and assemble, and is not suitable for small diameter cells.

U.S. Pat. No. 4,079,172 discloses sealed galvanic dry cells having at least one gas venting passage disposed at the interface of the top surface of the cover and then curled over the rim of the container. The passage is defined as being a recess in the cover disposed below the curled over rim and/or a notch in a portion of the curled over rim.

U.S. Pat. No. 5,227,261 relates to electrochemical cells which are comprised of a seal member that has a centrally located cylindrical hub joining a base, which base has a ventable diaphragm portion and a nonventable diaphragm portion, which hub has an end extending above the base and an end extending below the base, into which a current collector is inserted in an interference fit with the end extending above the base, which ventable diaphragm portion joins the hub at an interface forming an arc of between about 135 degrees and 250 degrees, and which interface is the thinnest portion of the base.

U.S. Pat. No. 4,255,499 relates to a galvanic cell in which a first arc portion between about 150° and 190° of the top peripheral edge of the container is turned or curled over the container's closure means so that when a predetermined high pressure build-up develops in the cell, the pressure will cause the closure means to tip or tilt about the diametral axis formed between the first arc portion and the remaining second arc portion so as to produce a vent passage at the interface of the container and the closure means proximal the remaining second arc portion of the top peripheral edge of the container.

As discussed above, resealable, high pressure relief vent valves are generally bulky and/or difficult to incorporate into a cell assembly, bulky type of blow-out safety vents are not suitable for small cell applications, while low pressure vent means for some cell systems may not adequately and sufficiently prevent loss of electrolyte through leakage or prevent ingress of oxygen from the atmosphere which could cause wasteful corrosion of the anode.

It is, therefore, an important object of this invention to provide a compact and economical pressure vent for use in a galvanic cell that will effectively occupy minimum volume so that maximum volume of the cell can be used for the active components of the cell.

Still another object of this invention is to provide a predetermined pressure vent for galvanic cells which requires a small number of parts and which is, therefore, easy to assemble and inexpensive to manufacture.

Another object of the present invention is to provide a vent which prevents premature release of gas pressure from within a galvanic cell.

The foregoing and additional objects will become more fully apparent from the following description and the accompanying drawings.

SUMMARY OF THE INVENTION

The invention relates to an electrochemical cell comprising an anode electrode, a cathode electrode and an electrolyte contained in a container, said container having an open end and a closed end and wherein the open end of the container is sealed with a V-shaped gasket, said gasket comprising a base member having an upstanding peripheral wall and a centrally located upstanding wall forming a hub defining an opening, said base member having a first segment extending radially inwardly from the upstanding peripheral wall to an inclined second segment, facing the open end of the container, which terminates at a third segment disposed substantially parallel to the upstanding wall of the hub, said third segment extending to a fourth segment disposed substantially perpendicular to the upstanding wall of the hub and terminating at the upstanding wall of the hub, and wherein the incline second segment and third segment form an angle of between 10° to 90° which defines the V-shaped portion of the gasket. Preferably, at least a portion of the area in the base adjacent to the upstanding wall of the hub, preferably between 10° to 360°, has a thickness less than the thickness of the remaining fourth segment. The gasket is provided with a compressive preload force at the reduced area on the base that will delay the onset of tensile stresses at the reduced area caused by any pressure buildup of gases produced in the cell, so that premature venting of the cell can be prevented.

The angle defined by the inclined second segment and the third segment is preferably between 30° to 60° and more preferably between 40° to 50°.

The gasket of this invention is constructed with several segments that cooperate during the sealing of the cell to place a compressive preload in a segment of the gasket that will delay the onset of tensile stresses in the vent area of the gasket and therefore prevent premature venting of the cell. It has been found that using the novel gasket of this invention, the onset of tensile stresses can be delayed, if desired, up to about 70 psi internal pressure for C-size cells. The assembly of the cell causes compression in the reduced area of the gasket adjacent the hub.

The purpose of compressive preloading is to delay the tensile stress concentration at the inside angle between the fourth segment and the wall of the hub under normal operating pressures. In the assembled cell the reduced area is in compression. As the internal pressure is increased, the inside angle defined as the angle between the reduced area and the wall of the hub, passes through 90 degrees.

The thickness of the reduced area in the fourth segment is preferably between 1/8 to 3/4 times the average area of the remaining area of the fourth segment, more preferably between 1/4 and 1/2 times the average area of the remaining area of the fourth segment.

The upstanding wall of the hub can be provided with a flange to accommodate the centrally disposed edge of the cover (inner cover) of a cell. Also the upstanding peripheral wall of the gasket could be provided with a flange to accommodate the peripheral edge of the inner cover. If desired, a rib or rim could be disposed on the upstanding peripheral wall of the gasket to secure the peripheral edge of the inner cover onto the first and second segments of the gasket.

Preferably, an inner cover having an opening to accommodate the hub is disposed within the peripheral wall and is secured between the peripheral wall and the hub of the seal assembly.

Preferably, the gasket in conjunction with the cover are secured to the container by redrawing and/or crimping the rim of the container against the gasket and the cover. In this embodiment, the gasket which is generally a nonconductive synthetic material, will act as a barrier to air and moisture and will be strong enough to maintain its sealing after it has been physically abused such as by dropping or exposure to vibration and/or subject to extreme variations in temperature and/or humidity and/or abuse charging.

Cylindrical alkaline cells are generally comprised of a containment means and the components located within the containment means. The containment means comprises an elongated container, that is open on one end, and a vent assembly. The assembly is made up of a terminal cover plate; an elastomeric gasket; and an inner cover and current collector. The members of the vent assembly are inserted into the open end of the container thereby sealing the container. The rim portion of the container could be then crimped inwardly to form a seal.

The sealing gasket of this invention comprises a material selected with consideration given to its stability in the presence of the electrolyte, its resiliency, and its resistance to cold flow. Suitable polymeric materials are selected from the group consisting of nylon, polytetrafluoroethylene, fluorinated etheylene-propylene, chlorotrifluoroethylene, perfluoroalkoxy polymer, polyvinyls, polyethylene, polypropylene, polystyrene and the like. Other suitable materials would be recognizable by one skilled in the art. In some applications, additional precautions can be used in conjunction with the gasket of this invention to provide a more effective seal, such as coating the flange of the gasket surfaces with an adhesive agent such as a fatty polyamide resin or asphalt. The sealing gasket of this invention is suitable for production techniques such as injection molding. The configuration of the surfaces of the gasket flanges is well suited for ease of removal from dies, punches and the like. Preferably the gasket would be nylon. The terminal cover should be made of a conductive material that will not corrode or otherwise deteriorate when in contact with the materials of the cell. The container for the cell could be made of stainless steel, iron, nickel, nickel-plated steel, or some other conductive material.

The invention also relates to a method for making a galvanic dry cell having a pressure vent closure with a safety feature that prevents premature venting of cell which comprises the steps:

(a) placing within an open ended conductive container a separator, an anode, a cathode, and an electrolyte and said open ended conductive container having an open edge portion;

(b) preparing a gasket comprising a base member having an upstanding peripheral wall and a centrally located upstanding wall forming a hub defining an opening, said base member having a first segment from the upstanding peripheral wall extending radially inwardly to an inclined second segment, facing the open end of the container, which terminates at a third segment disposed substantially parallel to the upstanding wall of the hub, said third segment extending to a fourth segment disposed substantially perpendicular to the upstanding wall of the hub and terminating at the upstanding wall of the hub, and wherein the inclined second segment and third segment form an angle of between 10° to 90° and preferably the reduced area adjacent to the upstanding wall of the hub has a thickness less than the thickness of the remaining fourth segment;

(c) assembling an inner cover within the gasket and having the cover-gasket assembly and a current collector placed into the container; and (d) forming the top edge portion of the container over the peripheral wall of the gasket onto the inner cover to provide a sealed cell. The gasket has a reduced area which is in a compressive preloading stress state. As used herein, the term forming the top edge portion of the container shall mean a redrawing step, a crimping step or any other step that will impart a compressive stress on the reduced area of the gasket.

BRIEF DESCRIPTION OF THE DRAWINGS

The present invention will become more apparent from the following description thereof when considered together with the accompanying drawings which are set forth as being exemplary of the embodiments of the present invention and is not intended in any way to be limitative thereof and wherein.

DETAILED DESCRIPTION OF THE PREFERRED EMBODIMENT

Figure 1:
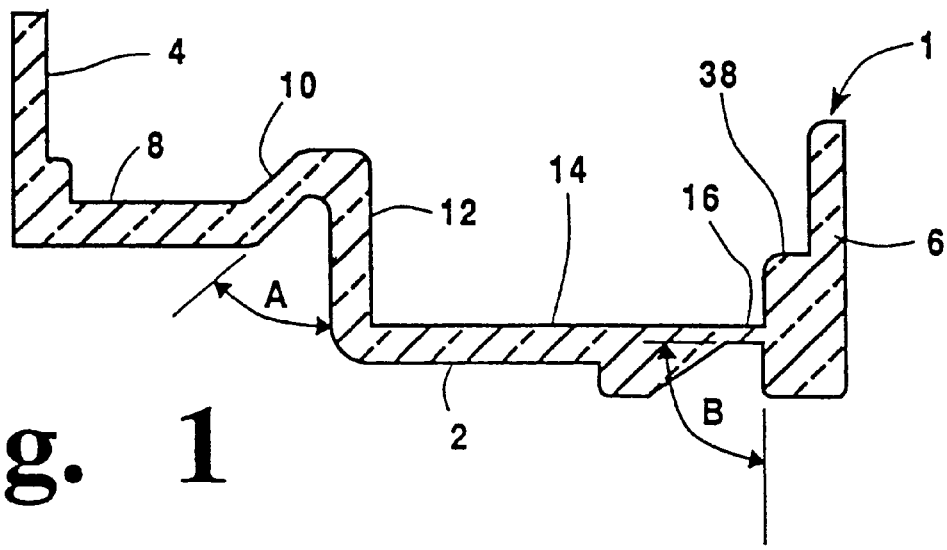
FIG. 1 is a partial cross section of a gasket for use in a cell.
Figure 3:
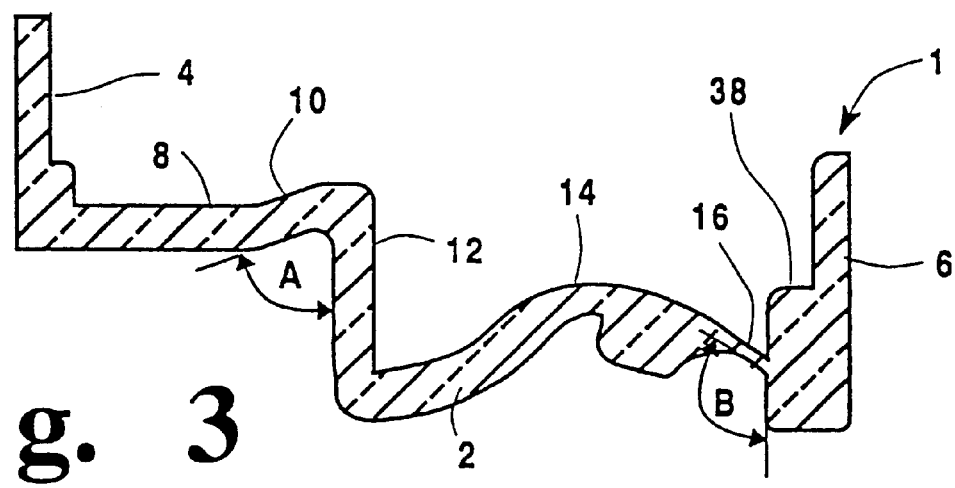
FIG. 3 is a partial cross section of a deformed gasket after being exposed to high internal pressure.
Figure 2:
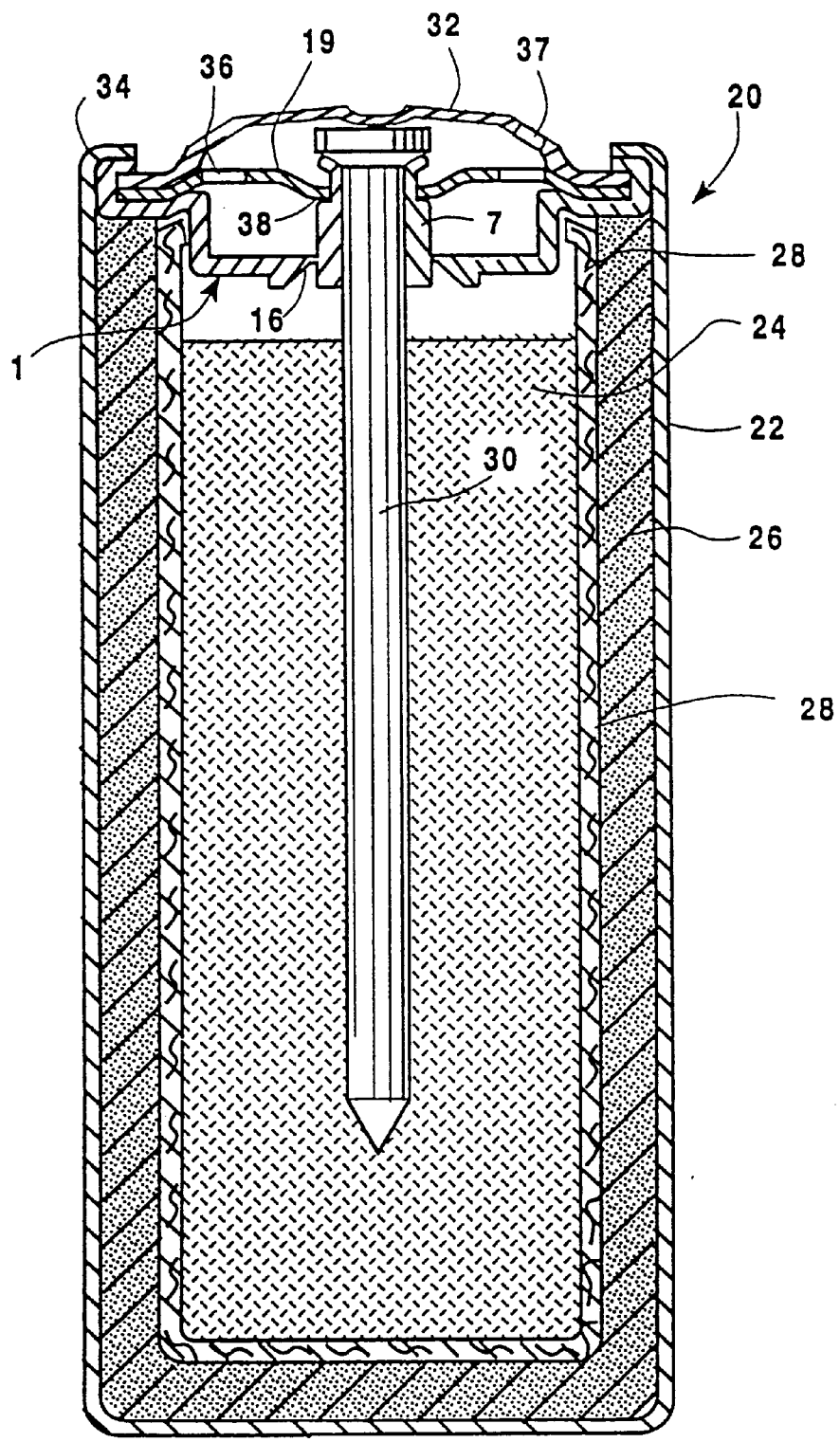
FIG. 2 is a sectional elevation of the gasket means of FIG. 1 shown after it has been assembled in a galvanic cell.

Referring to FIGS. 1–3, there is shown gasket 1 comprising a base member 2 extending with an upstanding peripheral wall 4 and an upstanding centrally located cylindrical hub 6. Disposed in the base member 2 between the upstanding peripheral wall 4 and hub 6 is a first segment 8, a second segment 10, third segment 12 and fourth segment 14. The angle A formed by second segment 10 and third segment 12 is shown as 60° and the thickness of the reduced area 16 is shown as ¼ the average thickness of the remaining area of fourth segment 14. A flange 38 is shown and is designed to support inner corner 19, as shown on FIG. 2. FIG. 2 shows the gasket of FIG. 1 assembled in a galvanic cell 20. The inside angle B as shown in FIG. 1 is 90° formed between the reduced area segment 16 and the wall 7 of hub 6.

FIG. 2 shows an assembled alkaline manganese dioxide-zinc cell 20 comprising container 22 having disposed therein an anode mix 24 and cathode 26 separated by a separator 28. The anode mix 24 could comprise particulated zinc with a gelling agent and an electrolyte, such as aqueous potassium hydroxide. The cathode could comprise manganese dioxide and a conductive material, such as graphite. As shown in FIG. 2, the gasket 1 of FIG. 1 is positioned within the open end of the container 22 where the gasket 1 rests on the cathode 26. If desired, a layer of sealant may be disposed at the interface of the seal and the container. Upon inserting gasket 1, cover 19 and current collector 30 in container 22, current collector 30 made good electrical contact in the anode mix 24. Once the gasket means 1 is seated within gasket 1, a terminal cover 32 is disposed over the current collector 30, and then the annular edge segment 34 of container 22 is radially compressed against the gasket 1, cover 19, cover 32, thereby radially sealing the gasket 1 to the opening of the container 22.

The inner cover 19 is designed to seat within seal gasket 1 on flange 38 of wall 7 of hub 6. An opening 36 is disposed in inner cover 19 and an opening 37 is disposed in terminal cover 32 to permit the internal pressure to vent.

As shown in FIG. 2, the reduced area 16 of the fourth segment 14 of the gasket 1 is put under a compressive stress during the redrawing and/or crimping step. This preloading stress on the gasket delays the onset of tensile stresses in the reduced area to prevent premature venting of the cell. FIG. 3 shows the gasket 1 of FIGS. 1 and 2 after being subjected to a high pressure force from within the cell that bows the fourth segment 14 outwardly and places the reduced area 16 in tension. If the pressure buildup is severe, the gasket will tear to permit venting.

It is to be understood that other modifications and changes to the preferred embodiment of the invention herein shown and described can also be made without departing from the spirit and scope of the invention.

The invention claimed is:

1. A method for making a galvanic dry cell having a pressure vent closure with a safety feature that prevents premature venting of cell which comprises the steps:

(a) placing within a conductive container a separator, an anode, a cathode, and an electrolyte;

(b) preparing a gasket comprising a base member having an upstanding peripheral wall and a centrally located upstanding wall forming a hub defining an opening, said base member having a first segment extending radially inwardly from the peripheral upstanding wall to an inclined second segment, facing the open end of the container, which terminates at a third segment disposed substantially parallel to the upstanding wall of the hub, said third segment extending to a fourth segment disposed substantially perpendicular to the upstanding wall of the hub and terminating at the upstanding wall of the hub, and wherein the inclined second segment and third segment form an angle of between 10° to 90°;

(c) assembling a cover member on the gasket and having the cover-gasket assembly and a current collector placed into the container; and (d) reducing the top edge portion of the container over the peripheral wall of the gasket onto the cover member to provide a sealed cell.

2. The method of claim 1 where in step (b), at least a portion of the area adjacent to the upstanding wall of the hub has a thickness less than the thickness of the remaining fourth segment and where in step (d) the reduced area is in a compressive preloading stress state.

3. The method of claim 1 wherein in step (d) the reducing procedure is a redrawing procedure.

4. The method of claim 1 wherein step (d) the reducing procedure is a crimping procedure.

5. The method of claim 3 wherein in step (d) a crimping procedure is also applied.

6. The method of claim 1 wherein the angle formed between the second segment and third segment is between 30° and 60°.

7. The method of claim 2 wherein the thickness of the reduced area of the fourth segment is between about ⅛ to about ¾ times the average thickness of the area of the fourth segment.

8. The method of claim 1 wherein the gasket is made of material selected from the group consisting of nylon, polytetrafluoroethylene, fluorinated etheylene-propylene, chlorotrifluorethylene, perfluoro-alkoxy polymer, polyvinyls, polyethylene, polypropylene and polystyrene.

9. The method of claim 1 wherein the anode is comprised of zinc, the cathode is comprised of manganese dioxide, and the electrolyte is potassium hydroxide.

* * * * *